United States Patent [19]

Matsuki

[11] 4,170,674
[45] Oct. 9, 1979

[54] COMPOSITE BOARD STRUCTURE USING A CORRUGATED FIBERBOARD AND A METHOD OF AND AN APPARATUS FOR PRODUCING THE COMPOSITE BOARD STRUCTURE

[75] Inventor: Masamitsu Matsuki, Sagamihara, Japan

[73] Assignee: Nissan Motor Company, Ltd., Yokohama, Japan

[21] Appl. No.: 817,445

[22] Filed: Jul. 20, 1977

[30] Foreign Application Priority Data

Jul. 21, 1976 [JP] Japan .................................. 51-87069

[51] Int. Cl.² ............................ B32B 3/28; B32B 3/10
[52] U.S. Cl. ........................................ 428/90; 181/292; 181/293; 428/138; 428/139; 428/182; 428/186; 428/245; 428/252; 428/284; 428/225
[58] Field of Search ........ 428/182, 186, 184, 137–140, 428/90, 225, 252, 245; 156/210; 181/292, 293

[56] References Cited

U.S. PATENT DOCUMENTS

| 1,025,443 | 5/1912 | Angier | 428/182 |
|---|---|---|---|
| 1,953,410 | 4/1934 | Jacobson | 181/292 |
| 2,428,591 | 10/1947 | Slayter | 428/137 |
| 3,616,135 | 10/1971 | Tesainer et al. | 156/210 |
| 3,904,800 | 9/1975 | Neubauer | 428/182 |
| 3,920,496 | 11/1975 | Wilkinson et al. | 428/186 |

FOREIGN PATENT DOCUMENTS

| 2310871 | 10/1976 | France | 428/182 |
|---|---|---|---|
| 52-21082 | 3/1976 | Japan | 428/182 |

Primary Examiner—George F. Lesmes
Assistant Examiner—P. Thibodeau

[57] ABSTRACT

A composite board structure comprising a corrugated fiberboard consisting of at least one liner and at least one corrugated paper medium bonded to the liner by means of a layer of a hot melt adhesive material, the liner being covered with a facing web of a woven or unwoven fabric which has its fibers scatteringly filling in perforations formed in the liner and sticking to the layer of the hot melt adhesive material so as to be securely fastened to the liner without use of any adhesive material between the liner and the facing web.

6 Claims, 7 Drawing Figures

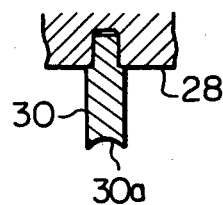
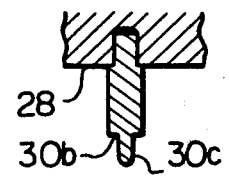
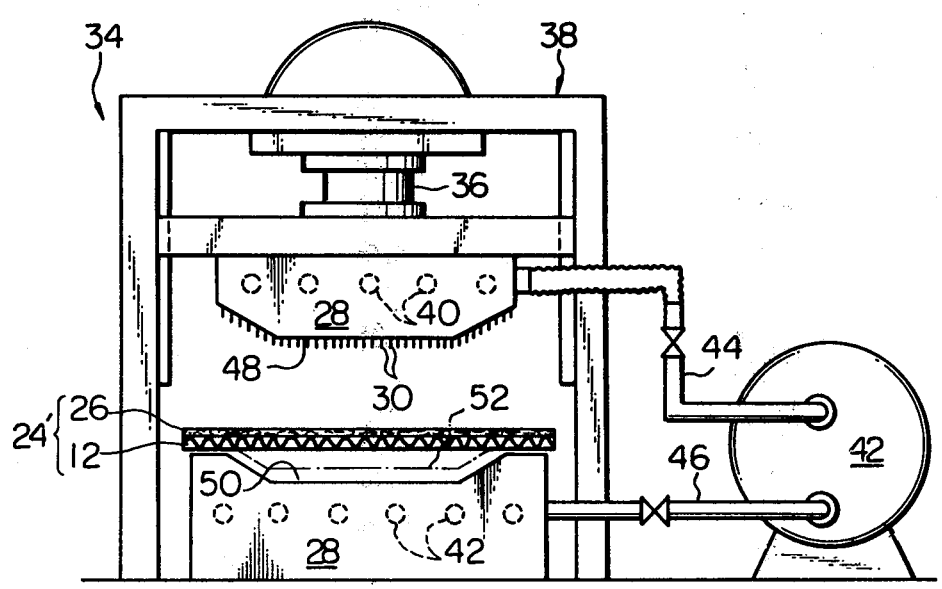

COMPOSITE BOARD STRUCTURE USING A CORRUGATED FIBERBOARD AND A METHOD OF AND AN APPARATUS FOR PRODUCING THE COMPOSITE BOARD STRUCTURE

The present invention relates to a composite board structure and, more particularly, to a composite board structure including a corrugated fiberboard as a basic component. The present invention is further concerned with a method of and an apparatus for producing such a composite board structure.

A known composite board structure of the character to which the present invention appertains generally comprises a corrugated fiberboard and a facing web of a non-woven fabric or a thermoplastic material such as cellular foams of polyurethane. The corrugated fiberboard used as the basic component of the composite board structure includes at least one even-surfaced liner and at least one corrugated paper medium which is bonded at the tops of its ridge portions to one face of the liner. The facing web of the non-woven fabric or thermoplastic material is bounded over its total area to the other face of the liner by means of a layer of a hot melt adhesive material of, usually, a thermoplastic synthetic resin polymer.

Composite board structures having such a basic construction are not only useful as ordinary packaging materials to form cartons, boxes and other types of containers but find a wide variety of practical applications where insulation of heat and/or sound and/or dampening out of mechanical vibrations is a serious requirement. The composite board structures have therefore proved useful particularly as interior linings for walls, floors and ceiling panels of residential or office buildings or as facings, trims and interlayers for various structural members of automotive vehicles, ships or boats, and aircrafts, for their stiffness, excellent heat and sound absorbing performances, light-weight constructions, low production and insulation costs, techniques to process corrugated fiberboards in such a manner that the fiberboards are inelastically deformed into three-dimensionally curved configurations without producing creases and fissures in the corrugated fiberboards.

When in bonding a facing web of a non-woven fabric or a thermoplastic material to the liner of a corrugated fiberboard during production of a composite board structure, the corrugated fiberboard and the facing web are heated to certain temperatures while the facing web is being pressed onto the liner of the corrugated fiberboard with a thin film of a hot melt adhesive material interposed between the liner and the facing web. By the heat thus applied to the facing web and the corrugated fiberboard, the film of the hot melt adhesive material therebetween is fused throughout the area of the film and sticks to the inner face of the facing web and the outer face of the liner of the corrugated fiberboard. When the corrugated fiberboard and the facing web are then allowed or forced to cool thereafter, the film of the fused hot melt adhesive material is set and forms a layer uniting the facing web and the corrugated fiberboard together.

The corrugated paper medium of a corrugated fiberboard to form part of a composite board structure to be produced in this fashion is bonded to the liner or liners of the fiberboard usually by a hot melt adhesive material which is initially in the form of a thin film interposed between the liner or each of the liners and the corrugated paper medium. Where it is desired that the assemblage of such a corrugated fiberboard from a liner or liners and a corrugated paper medium which is separate from the liner or liners and the bouding of a facing web to the liner or one of the liners be effected simultaneously, viz., in a single step, the facing web and the component sheet materials to form the corrugated fiberboard must be heated to considerably elevated temperatures so that the film of the hot melt adhesive material between the corrugated paper medium and the liner or each of the liners to form the corrugated fiberboard and the film of the hot melt adhesive material between the liner or one of the liners and the facing web are enabled to be properly fused by the heat transferred thereto. If, in this instance, the facing web is heated to an excessively high temperature, the external appearance of the facing web and accordingly the commercial value of the resultant composite board structure would be impaired critically. If, conversely, the component sheet materials to form the corrugated fiberboard fail to be heated to sufficiently high temperatures, then the heat applied to the liner or each of the liners would be unable to take up the mechanical stresses and strains which tend to be produced in the liner and would cause the liner or liners to produce creases and fissures therein especially when the liner or liners on the corrugated paper medium are being deformed three-dimensionally. This would also critically impair the commercial value of the resultant composite board structure.

Where, thus, a corrugated fiberboard is to be produced from separate component sheet material simultaneously when a facing web is being bonded to the liner or one of the liners to form part of the corrugated fiberboard, it is of paramount importance to precisely control the temperatures to which the facing web and the component sheet materials to form the corrugated fiberboard are to be heated.

Furthermore, the use of a hot melt adhesive material for bonding the facing web to the corrugated fiberboard to form a composite board structure is responsible for the production cost of the composite board structure which is presently rather expensive although such a board structure is more economical than those materials which are widely in use as the linings for structural members of the previously described types.

If the facing web to be used is formed of a material which is susceptible to heat, it may become necessary to have a sheet of insulating material additionally interposed between the facing web and the corrugated fiberboard so as to reduce the amount of heat to be transferred from the corrugated fiberboard to the facing web. Provision of such an extra material in a composite board structure will not only further raise the production cost of the composite board but will make the board structure disproportionately bulky in construction and heavy in weight and is detrimental to the commercial value of the article.

The present invention contemplates elimination of these drawbacks which have thus far been inherent in conventional composite board structures using corrugated fiberboards as the basic components of the board structures and in the production of such composite board structures.

It is, accordingly, an important object of the present invention to provide an improved composite board structure using a corrugated fiberboard as a basic component member and a woven or non-woven fibrous fabric as a facing web and free from defaults that would otherwise critically impair the external appearance and accordingly the commercial value of the composite board structure.

It is another important object of the present invention to provide an improved composite board structure which features an excellent external appearance inter alia and which is easy and economical to manufacture.

It is still another important object of the present invention to provide a method of producing such a composite board structure without resort to exacting control of the temperatures to which the component sheet materials to form the composite board structure are to be heated during production of the board structure.

It is still another important object of the present invention to provide a method of producing a composite board structure by securely fastening a facing web of a fibrous woven or non-woven fabric to a corrugated fiberboard or to a component sheet material to form part of the corrugated fiberboard without use of any adhesive material between the facing web and the corrugated fiberboard or the component sheet material to form part of the fiberboard.

It is still another important object of the present invention to provide a method of producing a composite board structure by securing a facing web of a fibrous woven or non-woven fabric to a corrugated fiberboard or to a component sheet material to form part of the corrugated fiberboard directly, viz., without use of any heat insulating material between the facing web and the corrugated fiberboard or the component sheet material to form part of the fiberboard.

Yet, it is another important object of the present invention to provide an apparatus which adapted to put such a method into practice in a simple and economical arrangement.

In accordance with a first outstanding aspect of the present invention, there is provided a composite board structure comprising a corrugated fiberboard having at least one liner and at least one corrugated paper medium which is bonded at the tops of its ridge portions to one face of the liner by means of a layer of a thermoplastic adhesive material, and a facing web of a fibrous fabric securely attached to the other face of the liner, wherein the liner is formed with a plurality of perforations and the fibrous fabric forming the above mentioned facing web has its fibers scatteringly filling in the perforations in the liner, the fibers in each of the perforations partially sticking to the layer of the thermoplastic adhesive material on the aforesaid one face of the liner so that the facing web is securely fastened to the aforesaid other face of the liner. The composite board structure thus constructed preferably has at least one portion which is three-dimensionally curved. The facing web may be formed of a woven or unwoven fibrous fabric.

In accordance with a second outstanding aspect of the present invention, there is provided a method of producing a composite board structure of the above described nature, the method comprising forming a corrugated fiberboard including at least one liner and at least one corrugated paper medium which is bonded at the tops of its ridge portions on one side of the paper medium to one face of the liner by a layer of a thermoplastic adhesive material which has a predetermined softening temperature and which is fusible when heated to a temperature higher than the predetermined softening temperature; placing a facing web of a fibrous fabric on the other face of the liner of the corrugated fiberboard; pressing the facing web onto the liner by a plurality of hot needles at the leading ends of the needles and piercing the liner with the needles for forming perforations in the liner and causing the fibrous fabric forming the facing web to have its fibers scatteringly pressed into the perforations in the liner, the needles being brought into contact with the layer of the thermoplastic adhesive material on the aforesaid one face of the liner through the above mentioned perforations and thereby causing the thermoplastic adhesive material to be fused in the vicinity of the perforations and to stick to the fibers filling in the individual perforations in the liner; thereafter removing the needles from the liner and the facing web; and allowing the fused thermoplastic adhesive material to cool and set. The facing web may be applied to the corrugated fiberboard subsequently to the step of forming the corrugated fiberboard but, if the fibrous fabric to be used as the facing web has a melting temperature which is higher than the softening temperature of the thermoplastic adhesive material, the corrugated fiberboard may be formed concurrently when the facing web is being attached to the liner to form part of the corrugated fiberboard. The needles are preferably passed through the facing web and the liner in directions substantially perpendicular to the liner.

In accordance with a third outstanding aspect of the present invention, there is provided an apparatus adapted to put the above described method into practice, such an apparatus comprising first and second members at least one of which is movable into and out of a position forming a predetermined clearance between the first and second members; a plurality of metal needles axially projecting from the first member toward the second member in directions substantially perpendicular to the thickness of the clearance; and means for heating the needles, each of the needles projecting from the first member over a length smaller than the thickness of the above mentioned clearance.

The features and advantages of a composite board structure according to the present invention and a method of and an apparatus for producing such a composite board structure in accordance with the present invention will be understood more clearly from the following description taken in conjunction with the accompanying drawings, in which:

FIG. 4 is a fragmentary sectional view showing, to an enlarged scale, a preferred example of the configuration of each of metal needles incorporated in the apparatus partially shown in FIGS. 2A and 2B;

FIG. 5 is a view similar to FIG. 4 but shows another example of the configuration of each of the metal needles incorporated in the apparatus partially shown in FIGS. 2A and 2B; and FIG. 6 is a schematic front elevation view showing a preferred embodiment of an apparatus according to the present invention.

Figure 1:
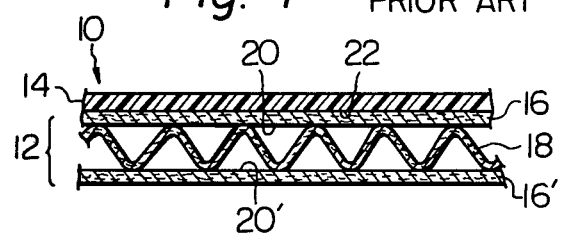
FIG. 1 is a cross sectional view showing part of a representative example of a prior-art composite board structure using a corrugated fiberboard.

Referring to FIG. 1 of the drawings, a known composite board structure to which the present invention appertains is designated in its entirety by reference numeral 10 and is shown comprising a double-faced or single-wall corrugated fiberboard 12 as a basic component of the composite board structure 10 and a facing web 14 of a suitable synthetic resin polymer such as cellular foams of polyurethane. The corrugated fiberboard 12 is composed of a pair of even-surfaced liners 16 and 16' which are spaced apart in parallel from each other, and an internal corrugated paper medium 18 which is sandwiched between the liners 16 and 16'. The corrugated paper medium 18 is bonded at the tops of its ridge portions on both sides of the paper medium 18 to the respective inner faces of the liners 16 and 16' by means of thin layers 20 and 20', respectively, of a suitable hot melt adhesive material which is usually a thermoplastic resin polymer such as, for example, polyethylene. The liners 16 and 16' and the corrugated paper medium 18 are thus securely consolidated into a unitary laminar construction forming the corrugated fiberboard 12. The facing web 14 has one of its faces bonded to the outer face of one of the liners 16 and 16' such as the liner 16 as shown of the corrugated fiberboard 12 also by means of a layer 22 of a hot melt adhesive material such as a thermoplastic resin polymer.

Where the composite board structure 10 thus constructed of the corrugated fiberboard 12 and the facing web 14 is to be utilized as, for example, an interior trim or lining for the door structures or the roof panel of an automotive vehicle or for any other structural member having a three-dimensionally curved surface, the blank of the composite board structure 10 as a whole is thermally deformed under mechanical pressure on a suitable hydraulically operated hot press (not shown) which per se is well known in the art and is thereby inelastically deformed into a predetermined three-dimensionally curved configuration conforming to the configuration of the surface of the member to which the composite board structure 10 is to be attached. While the blank of the composite board structure 10 is being heated on the hot press, the films of the hot melt adhesive material to result in the above mentioned layers 20, 20' and 22 are fused between the corrugated paper medium 18 and each of the liners 16 and 16' of the corrugated fiberboard 12 and between the liner 16 of the fiberboard 12 and the facing web 14. When the blank of the composite board structure 10 thus processed on the hot press is removed from the press, the fused hot melt adhesive material forming each of the layers 20, 20' and 22 is allowed to cool and set so that the resultant composite board structure 10 is enabled to inelastically maintain the three-dimensionally curved configuration thereof.

Where it is desired that the facing web 15 be applied to the liner 16 of the corrugated fiberboard concurrently when the corrugated fiberboard 10 is being formed from a blank consisting of the liners 16 and 16' and corrugated paper medium 18 which are separate from one another, the facing web 14 and the individual component sheet materials 16, 16' and 18 to make up the corrugated fiberboard 12 must be heated to considerably elevated temperatures so that the films of the hot melt adhesive materials to form the layers 20, 20' and 22 of the hot melt adhesive material in the composite board structure 10 to be obtained are enabled to be properly fused by the heat which is transferred thereto. If, in this instance, the facing web 14 of a thermoplastic material is formed with embossed patterns on its outer face and is heated to an excessively high temperature when being applied to the liner 16 on a hot press, the embossed patterns on the facing web 14 tend to be flattened and as a consequence the initial clear-cut boundaries of the patterns tend to be spoiled when the facing web 14 is pressed onto the liner 16 on the hot press. If, on the other hand, the facing web is formed of a napped or piled non-woven fabric and is heated to an excessively high temperature, then the naps or the piles of the fabric would be caused to fall and as a consequence the initial soft, fluffy texture and external appearance of the facing web would be critically damaged or lost. If, conversely, the liners 16 and 16' and the corrugated paper medium 18 to form the composite board structure 10 fail to be heated to sufficiently high temperatures, then the heat applied to such component sheet materials would be unable to take up the mechanical stresses and strains which tend to be produced in the component sheet materials and thereby cause the liners 16 and 16' to produce furrowlike or ridge-shaped creases and/or fissures therein especially when the liners 16 and 16' are being three-dimensionally curved. All these critically impair the external appearance and accordingly the commercial value of the resultant composite board structure. To avoid the above described problems, it is required to precisely control the temperatures to which the facing web 14 and the individual component sheet materials 16, 16' and 18 to form a corrugated fiberboard are to be heated, as previously pointed out. As has also been noted, furthermore, the use of the hot melt adhesive material for bonding the facing web 14 to the liner 16 of the corrugated fiberboard 12 is responsible for the presently still high production cost of the composite board structure 10. The present invention aims at resolution of these problems which have thus far been encountered in producing composite board structures using corrugated fiberboards in known methods.

Figure 2A:
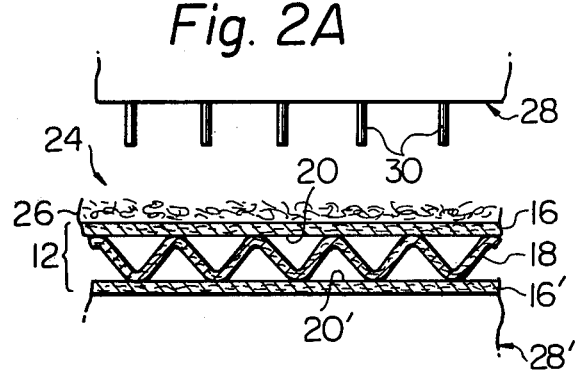
FIG. 2A is a view showing a cross section of a portion of a blank to form a preferred embodiment of a composite board structure according to the present invention and a front elevation of portions of an apparatus used to produce such a composite board structure in accordance with the present invention.
Figure 2B:
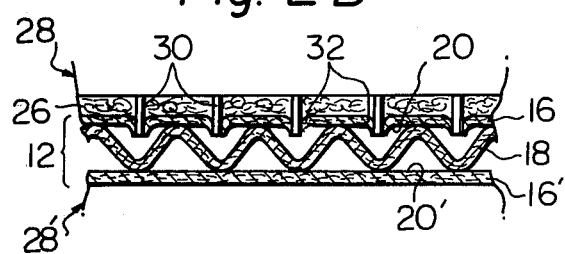
FIG. 2B is a view similar to FIG. 2A but shows a condition in which the blank shown in FIG. 2A is being formed into the composite board structure.

Referring to FIGS. 2A and 2B of the drawings, a composite board structure embodying the present invention as generally designated by reference numeral 24 is produced from a blank of a corrugated fiberboard as a basic component sheet material of the composite board structure 24 to be obtained and a facing web 26 of a woven or nonwoven fibrous fabric. The corrugated fiberboard to form part of the composite board structure 24 is herein assumed to be constructed similarly to the double-faced corrugated fiberboard 12 of the prior-art composite board structure 12 illustrated in FIG. 1 and is, thus, prepared from a pair of even-surfaced liners 16 and 16' and a corrugated paper medium 18, the corrugated fiberboard shown in FIGS. 2A and 2B being thus designated by the same reference numeral 12 as in FIG. 1.

As is further shown in FIGS. 2A and 2B, an apparatus to produce the composite board structure 24 from the initially separate component sheet materials including the liners 16 and 16', corrugated paper medium 18 and facing web 26 comprises first and second members or die blocks 28 and 28' having lower and upper pressing surfaces, respectively, which are spaced apart from each other. At least one of these die blocks 28 and 28' is movable relative to the other of the die blocks into and out of a position forming a predetermined clearance between the respective pressing surfaces of the two die blocks 28 and 28'. The die blocks 28 and 28' are arranged so that such a clearance to be formed therebetween has a thickness which is substantially equal to the desired thickness of the composite board structure 24 to be finally obtained. A number of pins or needles 30 are fixedly mounted on one of the first and second die blocks 28 and 28' such as the first die block 28 as shown and axially project from the lower pressing surface of toward the second die block 28' in directions substantially perpendicular to the clearance to be formed between the die blocks 28 and 28'. The projecting length of each of the needles 30 is such that each needle 30 is enabled to penetrate throughout the thicknesses of the facing web 26 and the liner 16 to which the facing web 26 is to be attached. In the arrangement shown in FIGS. 2A and 2B, it is assumed to be the first die block 28 which is movable into and out of the particular position forming the above described predetermined clearance between the die blocks 28 and 28'. The second die block 28' is thus assumed to be held at rest. Though not shown in FIGS. 2A and 2B, the apparatus thus comprising the first and second or movable and stationary die blocks 28 and 28' and the needless 30 mounted on the movable die block 28 further comprises suitable heating means which are operative to heat the die blocks 28 and 28' and the needless 30 when actuated.

For the production of the composite board structure 24 with use of the apparatus thus constructed and arranged, the liners 16 and 16' and the corrugated paper medium 18 are superposed on each other with a film 20 of a hot melt adhesive material interposed between the liner 16 and one side of the corrugated paper medium 18 and a film 20' of a hot melt adhesive material interposed between the liner 16' and the other side of the corrugated paper medium 18. The hot melt adhesive material forming each of the films 20 and 20' may be selected from the group consisting of polyethylene, polypropylene, polyvinyl chloride, polyvinyl acetate, polysthrene, ethylene-propylene copolymers and ethylene-vinyl acetate copolymers and is assumed to have a softening temperature which is lower than the melting temperature of the fibrous fabric constituting the facing web 26. The blank of the corrugated fiberboard 12 thus arranged is placed on the upper pressing surface of the stationary die block 28' with the liner 16 positioned on the upper side of the blank. The facing web 26 of the woven or non-woven fibrous fabric is placed on the outer face of the upper liner 16 without any adhesive material interposed therebetween.

When the upper movable die block 28 is moved downwardly from a position remote from the lower stationary die block 28' as shown in FIG. 2A toward the position to form the previously mentioned predetermined clearance between the respective pressing surfaces of the die blocks 28 and 28' as shown in FIG. 2B, the needles 30 on the movable die block 28 is first brought into pressing contact with the facing web 26 of the fibrous fabric, which is accordingly forced against the outer face of the liner 16 at its portions contacted by the needles 30. As the movable die block 28 is further moved toward the stationary die block 28', the individual needles 30 advance throughout the thickness of the facing web 26 and reach the outer face of the liner 16. When the movable die block 28 is moved into the position forming the predetermined clearance between the respective pressing surfaces of the die blocks 28 and 28' and thus has the blank of the corrugated fiberboard 12 and the facing web 26 clamped therebetween, the needles 30 on the movable die block 28 pierce the liner 16 and form perforations 32 in the liner 16 as shown in FIG. 2B. Under these conditions, the fibers forming the fibrous fabric constituting the facing web 26 partially twine round the individual needles 30 and are forced to scatteringly enter the perforations 32 by the needles 30 and to thus reach the film 20 of the hot melt adhesive material on the inner face of the perforated liner 16.

Figure 3:
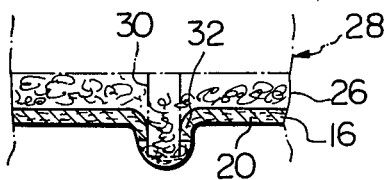
FIG. 3 is a cross sectional view showing, to an enlarged scale, a portion of the composite board structure formed from the blank illustrated in FIGS. 2A and 2B.

The die blocks 28 and 28' being heated by the previously described heating means, heat is applied to the facing web 26 and the blank of the corrugated fiberboard 12 from the respective pressing surfaces of the die blocks 28 and 28' with the result that the hot melt adhesive material forming each of the films 20 and 20' on the inner faces of the liners 16 and 16', respectively, is thermally fused. The heating means is effective also to heat the needles 30 either directly or through the upper movable die block 28 so that the hot melt adhesive material forming the film 20 on the liner 16 perforated by the needles 30 is heated not only by the die blocks 28 and 28' but by means of the needles 30 in vicinity of the perforations 32 through which the hot needles 30 are in contact with the film 20 of the hot melt adhesive material. The fibers forming part of the fibrous fabric of the facing web 26 and forced into the perforations 32 in the liner 16 partially stick to the fused hot melt adhesive material of the film 20 which is now rendered into a molten layer. If, in this instance, each of the needles 30 on the die block 28 is so sized as to have a length which will enable each needle to project beyond the film 20 of the hot melt adhesive material, not only the liner 16 but also the film 20 of the hot melt adhesive material is perforated and the fibers forming part of the fibrous fabric of the facing web 26 are caused to be tucked into the perforations in the film 20 as will be seen from FIG. 3 and are adhered to the layer 20 of the hot melt adhesive material with certainty. In order that the fibers forming part of the fibrous fabric of the facing web 26 be forced through the liner 16 and enabled to stick to the hot melt adhesive material of the film 20 more assuredly by the hot needles 30, each of the needles 30 may have its tip slightly dished out to form a sunk leading end 30a as shown in FIG. 4 or may have its cross section stepwise reduced as at 30b toward its leading end as shown in FIG. 5. In the case of the needle configuration illustrated in FIG. 5, it is preferable that the length of the reduced axial end portion 30c of the needle 30 be such that will be passed throughout the thickness of the facing web 26 when the die block 28 is moved into the previously mentioned position forming the predetermined clearance between the die blocks 28 and 28'.

The corrugated fiberboard 12 being thus compressed together with the facing web 26 between the respective pressing surfaces of the die blocks 28 and 28' and heated by the die blocks, the assembly of the corrugated fiberboard 12 and the facing web 26 is shaped into a predetermined configuration conforming to the configuration of the clearance between the die blocks 28 and 28'. The upper movable die block 28 is then moved upwardly, viz., away from the lower stationary die block 28' so that the needles 30 on the die block 28 are removed from the liner 16 and the facing web 26. The assembly of the corrugated fiberboard 12 and the facing web 26 is thereafter allowed to cool so that the fused hot melt adhesive material forming each of the layers 20 and 20' is allowed to set and inelastically maintain the configuration of the assembly. The facing web 26 of the woven or non-woven fibrous fabirc forming part of the composite fiberboard structure 24 thus obtained has its fibers scatteringly filling in the individual perforations 32 in the liner 16 covered with the facing web 26 and sticking to the layer 20 of the hot melt adhesive material on the inner face of the liner 16 and is securely fastened to the outer face of the liner 16.

The respective pressing surfaces of the die blocks 28 and 28' may be three-dimensionally curved so that the composite board structure 24 prepared by the use of such die blocks 28 and 28' has a three-dimensionally curved configuration. FIG. 6 illustrates an embodiment of the apparatus according to the present invention as arranged to comprise such die blocks 28 and 28'.

Referring to FIG. 6, such an apparatus is shown comprising a down-stroke type hydraulically operated hot press 34 in which the upper movable die block 28 is having pins or needles 30 mounted thereon positioned above the lower stationary die block 28' and is supported by the plunger of a hydraulic cylinder 36 which is mounted on a top cross member of a frame structure 38 so as to be vertically movable toward and away from the lower stationary die block 28'. The die blocks 28 and 28' have formed therein nestings of hot-fluid circulating passageways 40 and 40', respectively, which are communicable with a suitable source 42 of a hot fluid such as boiled oil or water steam through valved pipes 44 and 46, respectively. The pipe 44 leading to the upper movable die block 28 is arranged to be partially deformable for allowing the die block 28 to vertically move relative to the hot-fluid source 42 which is held stationary.

The upper movable die block 28 has a lower wall portion which is partially downwardly protruded to form a land 48 forming a lower pressing surface having a predetermined three-dimensionally curved configuration, while the lower stationary die block 28' has an upper wall portion which is partially downwardly recessed to form a depression 50 which is configured substantially conformingly to the lower pressing surface of the upper movable die block 28. The pins or needles 30 on the upper movable die block 28 are located only over that area of the die block 28 which is vertically aligned with the depression 50 in the lower stationary die block 28'. The upper movable die block 28 and the hydraulic cylinder 36 are arranged in such a manner that a certain clearance 52 is formed between the lower pressing surface of the upper movable die block 28 and the upper pressing surface of the lower stationary die block 28' when the upper movable die block 28 is moved by the hydraulic cylinder 36 into a predetermined lowermost position close to the lower stationary die block 28'. The clearance 52 thus formed between the respectively pressing surfaces of the die blocks 28 and 28' is shaped to conform to the desired configuration of the composite board structure to be obtained.

For production of such a composite board structure, a flat blank 24' consisting of a facing web 26 of a woven or non-woven fibrous fabric and separate component sheet materials to form a corrugated fiberboard 12 constructed as illustrated in FIGS. 2A and 2B is placed on the lower stationary die block 28', forming a cavity between the depression 50 in the die block 28' and the lower surface of the lowermost layer of the separate component sheet materials of the corrugated fiberboard 12 as shown. The die blocks 28 and 28' and the pins or needles 30 on the die block 28 are heated by the hot fluid which is circulated through the respective hot-fluid circulating passageways 40 and 40' in the blocks 28 and 28'. When the hydraulic cylinder 36 is actuated and the upper movable die block 28 is driven to move downwardly, the needles 30 on the die block 28 are first brought into pressing contact with the facing web 26 and thereafter the uppermost layer of the separate component sheet materials to form the corrugated fiberboard 12. The initially flat blank 24' is thus forced to deform into the cavity within the lower stationary die block 28'. When the upper movable die block 28 reaches the previously mentioned position forming the predetermined clearance 52 between the respective pressing surfaces of the die blocks 28 and 28', the blank 24' is clamped between the pressing surfaces of the die blocks 28 and 28' and the uppermost layer, such as the liner 16 shown in FIGS. 2A and 2B, of the blank 24' is perforated by the needles 30 on the upper movable die block 28 as previously described in detail with reference to FIGS. 2A and 2B. The initially flat blank 24' is thus inelastically deformed into a three-dimensional configuration conforming to the configuration of the clearance 52 between the respective pressing surfaces of the die blocks 28 and 28' and, furthermore, the facing web 26 is securely fastened to the uppermost layer of the corrugated fiberboard 12 at the end of the operation.

While the corrugated fiberboard 12 used to form the composite board structure 24 has been assumed to be made up of separate component sheet materials when the facing web 26 is to be applied thereto, it is apparent that the facing web 26 can be applied to a corrugated fiberboard 12 which is preliminarily prepared from liners 16 and 16' and a corrugated paper medium 18 with use of a film of a hot melt adhesive material interposed between the corrugated paper medium 18 and each of the liners 16 and 16'. In this instance, the first and second members 28 and 28' of the arrangement shown in FIGS. 2A and 2B merely serve respectively as a support or retainer for the needles 30 and a working table to receive the assembly of the corrugated fiberboard 12 and the facing web 26. The heating means for use with such members 28 28' may be arranged to heat only the needles 30 on the first member 28 so that the hot melt adhesive material of the film 20 on the inner face of the liner 16 covered with the facing web 26 is heated to a predetermined temperature of, for example, about 110° C. to 200° C. if polyethylene is used as the hot melt adhesive material.

The facing web 26 which has been pierced by the needles 30 may be formed with pierced impressions scattered over the outer face of the facing web. Such impressions will be virtually invisible if a non-woven fabric is used as the facing web 26 because the naps or piles of the fabric are in raised conditions. If, however, the facing web 26 is formed of a woven fabric, the facing web may conspicuously show the pierced impressions and impair the external appearance of the product. To avoid this, the facing web 26 of, especially, a woven fabric may be flocked with short fibers at locations over the perforations 32 in the liner 16.

What is claimed is:

1. A composite board structure comprising a corrugated fiberboard having at least one liner and at least one corrugated paper medium which is bonded at the tops of its ridges to one face of the liner by means of a layer of a thermoplastic adhesive material, and a facing web of a fibrous fabric securely attached to the other face of said liner without an intervening adhesive layer, wherein the liner is formed with a plurality of perforations and the fibers of the fibrous fabric forming said facing web are partially stuffed into said perforations, the fibers in each of the perforations partially sticking to the layer of the thermoplastic adhesive material on said one face of the liner so that the facing web is securely fastened to said other face of the liner partially by the fibers retained in the individual perforations and partially by said adhesive material.

2. A composite board structure as set forth in claim 1, in which said facing web is formed of a woven fabric.

3. A composite board structure as set forth in claim 2, in which said woven fabric is formed of natural fibers.

4. A composite board structure as set forth in claim 1, in which said facing web is formed of a synthetic resin polymer.

5. A composite board structure as set forth in claim 1, in which said facing web is flocked with short fibers over said perforations in said liner.

6. A composite board structure as set forth in claim 1, having at least one portion three-dimensionally curved.

* * * * *